(12) United States Patent
Rule et al.

(10) Patent No.: US 11,544,717 B2
(45) Date of Patent: Jan. 3, 2023

(54) TAP CARD TO SECURELY GENERATE CARD DATA TO COPY TO CLIPBOARD

(71) Applicant: Capital One Services, LLC, McLean, VA (US)

(72) Inventors: Jeffrey Rule, McLean, VA (US); Paul Moreton, McLean, VA (US); Wayne Lutz, McLean, VA (US); Jason Ji, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 34 days.

(21) Appl. No.: 17/382,541

(22) Filed: Jul. 22, 2021

(65) Prior Publication Data

US 2021/0350372 A1 Nov. 11, 2021

Related U.S. Application Data

(63) Continuation of application No. 16/265,937, filed on Feb. 1, 2019, now Pat. No. 11,120,453.

(51) Int. Cl.
*G06Q 20/00* (2012.01)
*G06Q 20/40* (2012.01)
*G06F 16/955* (2019.01)
*G06Q 20/34* (2012.01)
*G06Q 20/38* (2012.01)

(52) U.S. Cl.
CPC ....... *G06Q 20/409* (2013.01); *G06F 16/9566* (2019.01); *G06Q 20/352* (2013.01); *G06Q 20/3829* (2013.01); *G06Q 20/4018* (2013.01); *G06Q 2220/00* (2013.01)

(58) Field of Classification Search
CPC .............. G06Q 20/409; G06Q 20/352; G06Q 20/3829; G06Q 20/4018; G06Q 2220/00; G06Q 20/3278; G06Q 20/382; G06Q 20/40975; G06Q 20/351; G06F 16/9566; G06F 9/543; H04L 63/168; H04L 63/0853; G07F 7/08; G07F 7/0833; H04W 4/80
USPC .......................... 705/16, 21, 59; 380/44, 262
See application file for complete search history.

(56) References Cited

U.S. PATENT DOCUMENTS

2014/0304839 A1* 10/2014 Hansen ............... G06F 21/6209
726/29

* cited by examiner

*Primary Examiner* — Dante Ravetti
(74) *Attorney, Agent, or Firm* — KDB

(57) ABSTRACT

A web browser may output a form comprising a payment field. A URL may be received from a communications interface of a contactless card, the URL comprising encrypted data generated by the contactless card based on a private key stored in a memory of the contactless card. An application may transmit the encrypted data to an authentication server, which may decrypt the encrypted data based on the private key. The application may receive, from a virtual account number server, a virtual account number. The application may receive an expiration date and a CVV. The application may copy the virtual account number to a clipboard of an OS. The OS may paste the virtual account number from the clipboard to the payment field of the form in the web browser. The OS may output a notification comprising the expiration date and the CVV associated with the virtual account number.

20 Claims, 11 Drawing Sheets

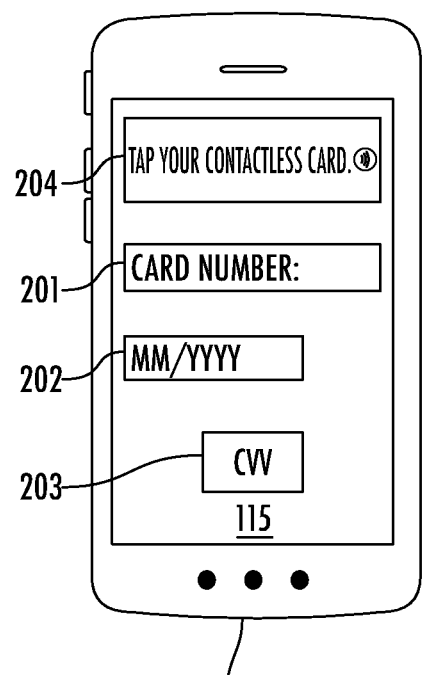
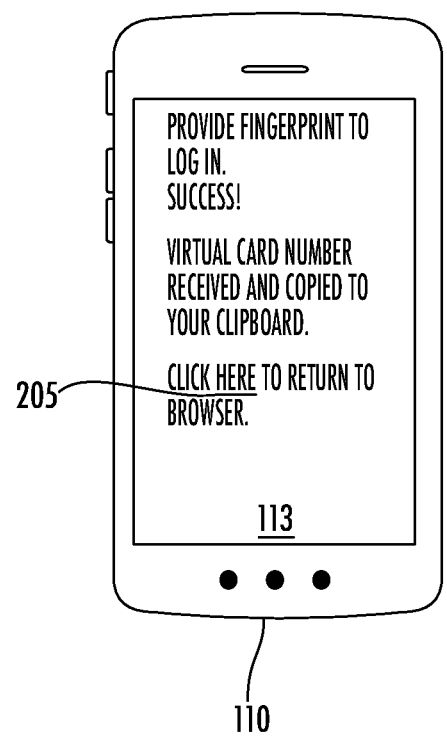
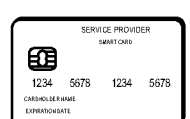
FIG. 2A
FIG. 2B

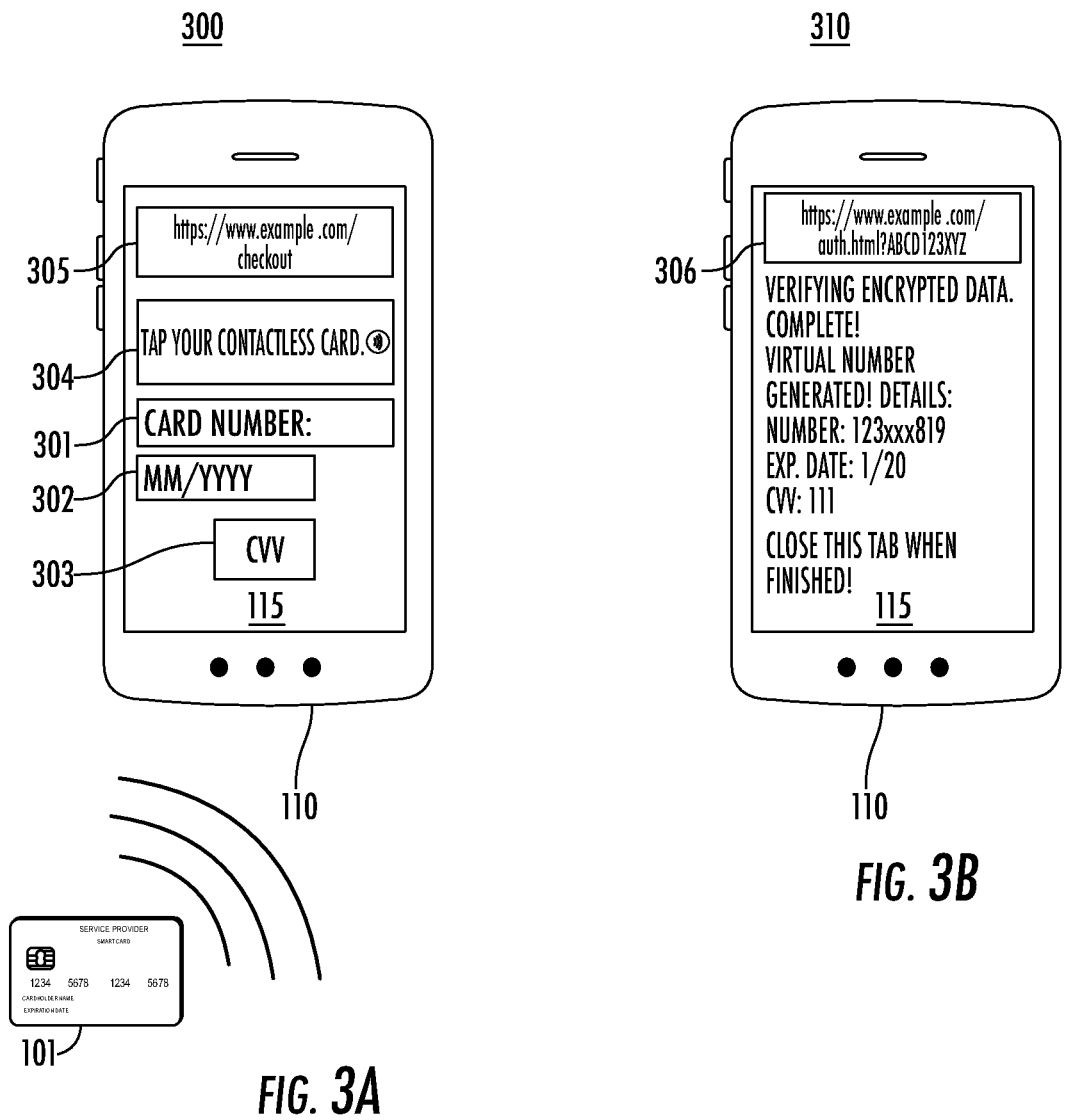

US 11,544,717 B2

TAP CARD TO SECURELY GENERATE CARD DATA TO COPY TO CLIPBOARD

RELATED APPLICATIONS

This application is a continuation of U.S. patent application Ser. No. 16/265,937, titled "TAP CARD TO SECURELY GENERATE CARD DATA TO COPY TO CLIPBOARD" filed on Feb. 1, 2019. The contents of the aforementioned application are incorporated herein by reference in their entirety.

TECHNICAL FIELD

Embodiments herein generally relate to computing platforms, and more specifically, to tapping a card to a computing device to securely generate card data which can be copied to a clipboard of the computing device.

BACKGROUND

Account identifiers for payment cards are often long numeric and/or character strings. As such, it is difficult for a user to manually enter the account identifier correctly. Indeed, users often make mistakes and enter incorrect account identifiers into computing interfaces (e.g., payment interfaces). Furthermore, processes have been developed that allow cameras to capture and identify account identifiers entered in a device, thereby posing security risks to account identifiers. Further still, certain operating systems restrict the ability to access identifiers stored on a contactless card, which blocks conventional attempts to programmatically copy and/or paste the account identifier.

SUMMARY

Embodiments disclosed herein provide systems, methods, articles of manufacture, and computer-readable media for tapping a contactless card to securely generate card data to copy to a clipboard. According to one example, a web browser executing on a processor circuit may output a form comprising a payment field. A uniform resource locator (URL) may be received from a communications interface of a contactless card, the URL comprising encrypted data generated by the contactless card based at least in part on a private key for the contactless card stored in a memory of the contactless card. An application executing on the processor circuit may transmit the encrypted data to an authentication server, the authentication server to verify the encrypted data by decrypting the encrypted data based at least in part on a private key for the contactless card stored in a memory of the authentication server. The application may receive, from a virtual account number server based on the verification of the encrypted data by the authentication server, a virtual account number. The application may receive an expiration date associated with the virtual account number, and a card verification value (CVV) associated with the virtual account number. The application may copy the virtual account number to a clipboard of an operating system (OS) executing on the processor circuit. The OS may paste the virtual account number from the clipboard to the payment field of the form in the web browser. The OS may output a notification comprising the expiration date and the CVV associated with the virtual account number.

BRIEF DESCRIPTION OF THE DRAWINGS

FIGS. 2A-2D illustrate embodiments of tapping a contactless card to securely generate card data to copy to a clipboard.

FIGS. 3A-3D illustrate embodiments of tapping a contactless card to securely generate card data to copy to a clipboard.

DETAILED DESCRIPTION

Figure 1A:
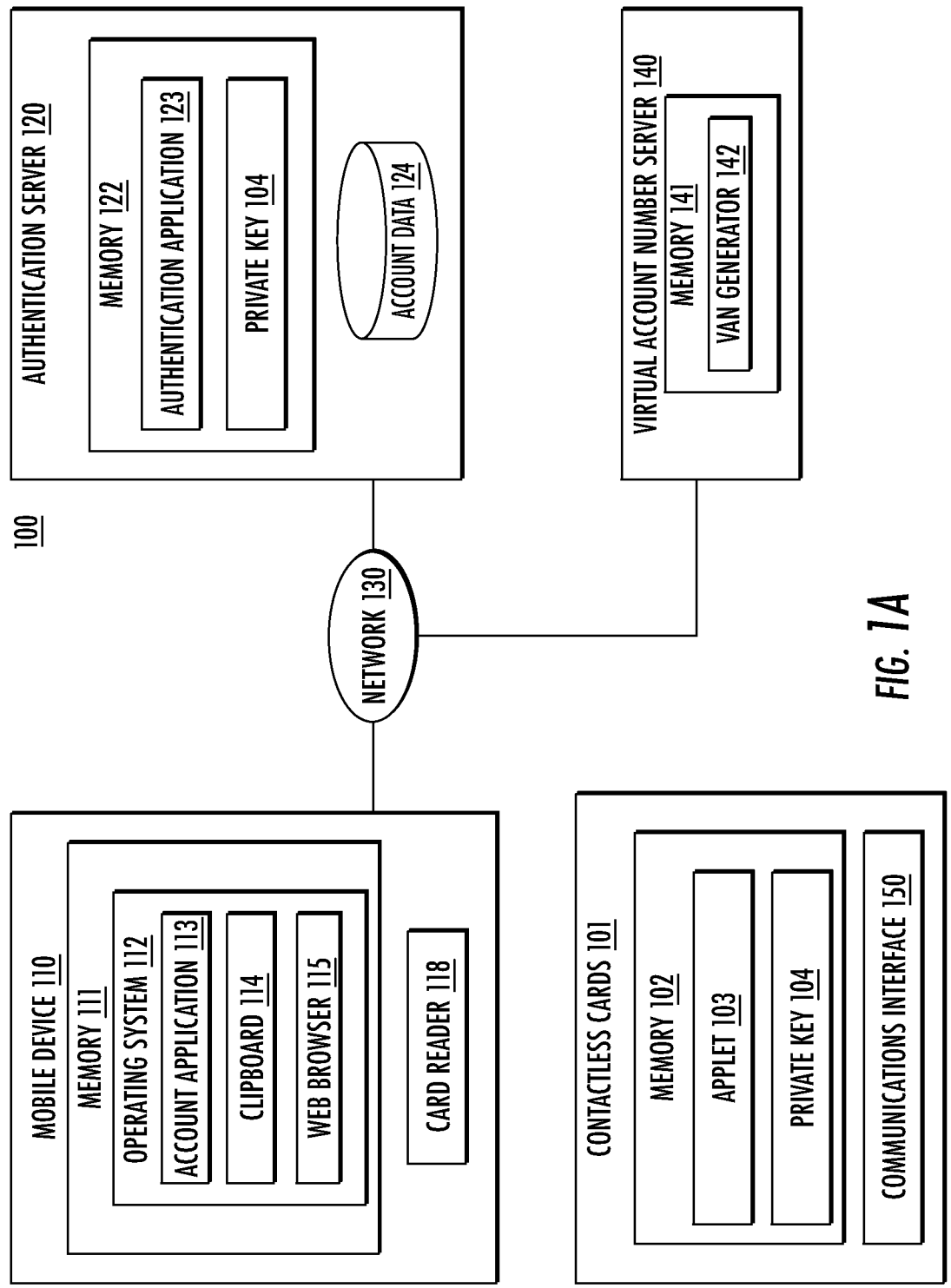
FIGS. 1A-1C illustrate embodiments of a system to tap a contactless card to securely generate card data to copy to a clipboard.

Embodiments disclosed herein provide secure techniques to use a contactless card to generate card data (e.g., an account number, expiration date, customer billing address, shipping address, and/or card verification value (CVV)) which can be copied to a clipboard of a computing device. Generally, the contactless card may come within communications range of a computing device, e.g., via a tap gesture. Doing so causes the contactless card to generate a uniform resource locator (URL), which is transmitted to the computing device. The URL may include data used by an authentication server as part of a validation process. For example, the URL may include encrypted data that is decrypted by the server as part of the validation process. As another example, the URL may include a unique identifier associated with the contactless card, which is used by the authentication server as part of the validation process. Once validated, the authentication server may instruct a virtual account number server to generate card data for the account associated with the contactless card. The card data may include a virtual account number, an expiration date, and a CVV. The generated card data may then be transmitted to the computing device. In some embodiments, account holder information (e.g., name, billing address, shopping address, etc.) may also be transmitted to the computing device. The computing device may copy at least one element (e.g., the virtual account number, expiration date, and/or CVV) of the card data and/or the account holder information (e.g., the name, billing address, and/or shopping address) to the clipboard. Once copied to the clipboard, the data may be copied into a corresponding field of a form in a web browser and/or other application. Furthermore, a notification may be outputted which includes the one or more elements of the generated card data and/or the account holder information. The notification may allow other elements of data to be copied to the clipboard, which may then be pasted to the payment fields of the form.

Advantageously, embodiments disclosed herein improve security of all devices and associated data. For example, some operating systems may restrict access to data stored in contactless cards, and/or specific types of data stored in contactless cards. Therefore, conventional techniques to copy and/or autofill card data cannot function properly. Advantageously, however, embodiments disclosed herein allow card data to be securely generated, transmitted, copied, and/or autofilled in any type of operating system. Furthermore, conventional approaches require the user to manually enter card data into a form. However, doing so may allow other users or devices to capture the card data as the user enters the card data into the form. By eliminating the need for the user to manually enter card data into the form, the security of the card data is enhanced. Furthermore, the validation performed by the server provides an additional safeguard to ensure that the correct card data is being entered into the form. Additionally, the generation and filling of virtual card numbers into the form protects the security of the actual account number of the contactless card, as conventional solutions require providing the actual account number of the contactless card into the form.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, an authentication server 120, and a virtual account number server 140. The contactless cards 101 are representative of any type of payment card, such as a credit card, debit card, ATM card, gift card, and the like. The contactless cards 101 may comprise one or more communications interfaces 150, such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The servers 120, 140 are representative of any type of computing device, such as a server, workstation, compute cluster, cloud computing platform, virtualized computing system, and the like.

As shown, a memory 111 of the mobile device 110 includes an instance of an operating system (OS) 112. Example operating systems 112 include the Android® OS, iOS®, Linux®, and Windows® operating systems. As shown, the OS 112 includes an account application 113, a clipboard 114, and a web browser 115. The account application 113 allows users to perform various account-related operations, such as viewing account balances, purchasing items, and/or processing payments. In some embodiments, a user must authenticate using authentication credentials to access the account application 113. For example, the authentication credentials may include a username and password, biometric credentials, and the like. In some embodiments, the authentication server 120 may provide the required authentication as described in greater detail below. The web browser 115 is an application that allows the mobile device 110 to access information via the network 130 (e.g., via the Internet). For example, a user may make purchases from a merchant's website using the web browser 115. The web browser 115 is one example of an application used to access information via the network 130 (e.g., to make purchases). The use of a web browser as a reference example herein should not be considered limiting of the disclosure, as the disclosure is equally applicable to other types of applications used to access information via the network, such as applications provided by merchants that allow users to make purchases.

When using the web browser 115 (or another application), a user may encounter a form that includes one or more payment fields. Conventionally, the user is required to manually enter their card number, expiration date, and/or CVV. Some mobile operating systems allow such data to be autofilled into forms, but other mobile operating systems impose restrictions on autofilling such data. Advantageously, embodiments disclosed herein solve such issues by leveraging the contactless card 101 to trigger the generation of a virtual account number, expiration date, and/or CVV that can be copied to the clipboard 114 of the OS 112.

More specifically, a user may tap the contactless card 101 to the mobile device 110, thereby bringing the contactless card 101 sufficiently close to the card reader 118 of the mobile device 110 to enable NFC data transfer between the communications interface 150 of the contactless card 101 and the card reader 118 of the mobile device 110. In some embodiments, the mobile device 110 may trigger the card reader 118 via an application program interface (API) call. In one example, the mobile device 110 triggers the card reader via an API call responsive to the user tapping or otherwise selecting an element of the user interface, such as a form field. In addition and/or alternatively, the mobile device 110 may trigger the card reader 118 based on periodically polling the card reader 118. More generally, the mobile device 110 may trigger the card reader 118 to engage in communications using any feasible method. After communication has been established between mobile device 110 and contactless card 101, the contactless card 101 generates a message authentication code (MAC) cryptogram. In some examples, this may occur when the contactless card 101 is read by the account application 113. In particular, this may occur upon a read, such as an NFC read, of a near field data exchange (NDEF) tag, which may be created in accordance with the NFC Data Exchange Format.

More generally, the applet 103 executing on a processor (not pictured) of the contactless card 101 generates and transmits data to the mobile device 110 via the communications interface 150. In some embodiments, the data generated by the contactless card 101 may include a URL. The URL may be directed to the authentication server 120, or some other URL associated with an entity issuing the contactless card 101. The URL may further be a universal link URL that opens a local resource (e.g., a page of the account application 113). The URL may further include data (e.g., parameters) used by the authentication server 120 to validate the data generated by the contactless card 101.

For example, the applet 103 of the contactless card 101 may use a cryptographic algorithm to generate a cryptographic payload based at least in part on the private key 104 stored in the memory 102 of the contactless card 101. Generally, the applet 103 may use any type of cryptographic algorithm and/or system to generate the cryptographic payload, and the use of a specific cryptographic algorithm as an example herein should not be considered limiting of the disclosure. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. In some embodiments, the applet 103 may perform encryption using a key diversification technique to generate the cryptographic payload. Examples of key diversification techniques are described in U.S. patent application Ser. No. 16/205,119, filed Nov. 29, 2018. The aforementioned patent application is incorporated by reference herein in its entirety. The applet 103 of the contactless card 101 may include the cryptographic payload as a parameter of the URL.

As another example, the applet 103 of the contactless card 101 may include, in the URL, some other string used to identify the contactless card 101. For example, the URL may include a subset of the digits (or characters) of an account number associated with the contactless card 101. For example, if the account number is 16 digits, the applet 103 of the contactless card 101 may include 4 of the digits of the account number as a parameter of the URL. The account number may be any type of account number, such as a primary account number (PAN), a one-time use virtual account number, and/or a token generated based on the PAN.

The applet 103 may then transmit the generated data to the mobile device 110, which may transmit the received data to the authentication server 120. The authentication application 123 may then authenticate the received data. For example, if the URL includes the cryptographic payload, the authentication application 123 may decrypt the cryptographic payload using a copy of the private key 104 stored in the memory 122 of the server 120. The private key 104 may be identical to the private key 104 stored in the memory 102 of the contactless card 101, where each contactless card 101 is manufactured to include a unique private key 104 (and the server 120 stores a corresponding copy of each unique private key 104). Therefore, the authentication application 123 may successfully decrypt the cryptographic payload, thereby verifying the payload. As another example, the authentication application 123 may confirm that the digits of the account number match digits of the account number associated with the contactless card 101 stored in the account data 124, thereby verifying the account number.

Regardless of the verification technique used by the authentication application 123, once verified, the authentication application 123 may instruct the virtual account number (VAN) generator 142 in the memory 141 of the virtual account number server 140 to generate a virtual account number, expiration date, and CVV for the account associated with the contactless card 101. In at least one embodiment, the virtual account number generated by the VAN generator 142 is restricted to a specific merchant, or group of merchants. The virtual account number may further include other restrictions (e.g., time restrictions, location restrictions, amount restrictions, etc.). Once generated, the VAN generator 142 may provide the virtual account number, expiration date, and CVV to the mobile device 110 and/or the authentication server 120. The VAN generator 142 and/or the authentication server 120 may further provide the account holder name, billing address, and/or shipping address to the mobile device 110. In some embodiments, however, the account holder name, shipping address, and/or billing address are stored locally by the mobile device 110. The VAN generator 142 and/or the authentication server 120 may provide the data to the mobile device 110 via any suitable method, such as a push notification, text message, email, via the web browser 115, etc.

Once received by the mobile device 110, the virtual account number, the expiration date, the CVV, the account holder name, billing address, and/or shipping address may be copied to the clipboard 114 of the OS 112. Doing so allows the user to paste the copied data to the corresponding field in the web browser 115. For example, the user may paste the account number to an account number field of the form in the web browser 115. In some embodiments, a notification may be outputted on the mobile device 110 that includes the expiration date and CVV. The notification may further include the account holder name, billing address, and/or shipping address. The notification may be outputted after some predefined amount of time (e.g., 5 seconds after the virtual account number is copied to the clipboard 114). The notification may allow the user to directly copy the account holder name, billing address, shipping address, expiration date and/or CVV to the clipboard 114 for pasting into corresponding fields of the form in the web browser 115.

Generally, the clipboard 114 stores data that can be copied and/or pasted within the OS 112. For example, the clipboard 114 may store data locally for pasting into fields of the mobile device 110, and a user may input/paste the data stored in the clipboard 114 using a command and/or gesture available within the OS 112. For example, copying the account number to the clipboard 114 allows the user to paste the account number to the corresponding form field using a command and/or gesture available within the OS 112. Furthermore still, the account application 113 may output a notification which specifies the expiration date and the CVV while the account number is copied to the clipboard 114. Doing so allows the user to manually enter the expiration date and CVV to the corresponding form fields while the notification remains in view. In some embodiments, the account application 113 and/or the OS 112 may also copy the expiration date, billing address, and/or the CVV to the clipboard 114, allowing the expiration date, billing address, and/or the CVV to be pasted to the corresponding form fields.

Figure 1B:
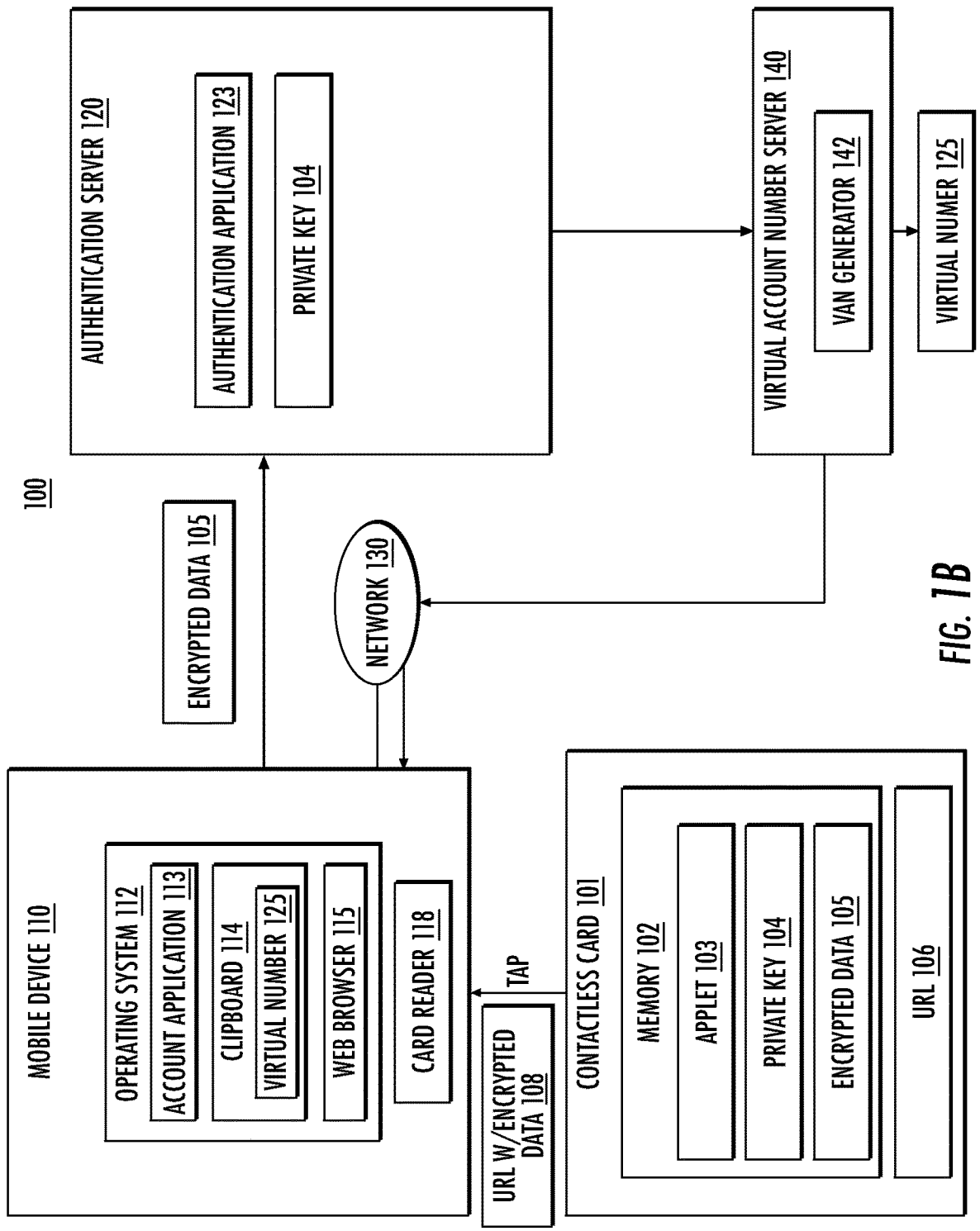

FIG. 1B depicts an embodiment where the applet 103 of the contactless card 101 generates a cryptographic payload for verification by the authentication application 123. As stated, when a user may encounter a payment form in the web browser 115. In response, the OS 112 and/or the account application 113 may output a notification instructing the user to tap the contactless card 101 to the mobile device 110. In some embodiments, the user may select a form field associated with payment (e.g., an account number field, expiration date field, and/or CVV field), which brings focus to the form field. In such embodiments, the OS 112 and/or the account application 113 may output the notification to tap the contactless card 101 to the mobile device 110 upon determining the payment field has received focus. As another example, the OS 112 and/or the account application 113 may determine that the form includes one or more payment fields. For example, in some embodiments, the account application 113 and/or OS 112 reads metadata of a form field to determine the type of information. For example, the metadata of a form field may specify that the form field is associated with the account number field, expiration date field, CVV field, shipping address field, and/or billing address field. In some embodiments, information such as the 16-digit card number, CVV, and customer name may be available offline, while other information such as addresses and generated virtual numbers are not available offline and may require a network connection. In response, the account application 113 and/or the OS 112 may output a notification to tap the contactless card 101 to the mobile device 110. Therefore, the account application 113 and/or the OS 112 may output the notification to tap the contactless card 101 to the mobile device 110 based on automatically determining that the form includes one or more payment fields and/or based on determining that the payment field has received focus.

Once tapped, the applet 103 of the contactless card 101 may generate encrypted data 105 based on the private key 104. In one embodiment, once the contactless card 101 is tapped to the mobile device 110, the contactless card 101 generates and transmits the encrypted data 105 to the mobile device 110. In another embodiment, once the contactless card 101 is tapped to the mobile device 110, the account application 113 may instruct the contactless card 101 to generate and transmit the encrypted data 105 to the mobile device 110. In some embodiments, the encrypted data 105 may be a string of characters, for example, "A1B2C3Z". The applet 103 may further determine a URL 106. The URL 106 may be directed to the authentication server 120. In some embodiments, the applet 103 dynamically generates the URL 106. In other embodiments, the applet 103 dynamically selects a URL 106 that is one of a plurality of URLs 106 stored in the memory 102. In some embodiments, the URL 106 is a universal link that opens one or more pages of the account application 113. The applet 103 may include the generated encrypted data 105 as a parameter of the URL 106, thereby generating a URL with encrypted data 108. For example, the URL 106 may be "http://www.example.com/". Therefore, the URL with encrypted data 108 may be "http://www.example.com/?A1B2C3Z".

In some embodiments, the applet 103 may encode the encrypted data 105 according to an encoding format compatible with URLs prior to including the encrypted data 105 as a parameter of the URL 106. For example, the encrypted data 105 may be a string of binary data (e.g., zeroes and ones), which may not be compatible with URLs. Therefore, the applet 103 may encode the encrypted data 105 to the American Standard Code for Information Interchange (ASCII) base64 encoding format. Doing so represents the binary encrypted data 105 in an ASCII string format by translating it into a radix-64 representation (e.g., "ABC123Z" in the previous example).

The contactless card 101 may then transmit the URL with encrypted data 108 to the mobile device 110. The account application 113 may then be opened to the corresponding page, where the account application 113 extracts the encrypted data 105 from the URL with encrypted data 108. In some embodiments, if the user is not logged in to the account application 113, the account application 113 opens a login page where the user provides credentials to log in to an account in prior to extracting the encrypted data 105. The account application 113 may then transmit the encrypted data 105 to the authentication server 120 via the network 130. In one embodiment, the account application 113 transmits the encrypted data to the URL 106 generated by the contactless card 101. In other embodiments, as described in greater detail below, the URL with encrypted data 108 causes the web browser 115 to open a new tab and follow the URL with encrypted data 108. In such embodiments, the URL with encrypted data 108 leads to the authentication application 123, which may extract the encrypted data 105 from the URL with encrypted data 108.

Once received, authentication application 123 may then attempt to decrypt the encrypted data 105 using the private key 104 associated with the contactless card 101. As stated, in some embodiments, the encrypted data 105 is encoded by the applet 103. In such embodiments, the authentication application 123 may decode the encrypted data 105 prior to the attempted decryption. If the authentication application 123 is unable to decrypt the encrypted data to yield an expected result (e.g., a customer identifier of the account associated with the contactless card 101, etc.), the authentication application does not validate the encrypted data 105, and does not instruct the VAN generator 142 to generate a virtual account number. If the authentication application 123 is able to decrypt the encrypted data to yield an expected result (e.g., the customer identifier of the account associated with the contactless card 101, etc.), the authentication application validates the encrypted data 105, and instructs the VAN generator 142 to generate a virtual account number, expiration date, and CVV value. As shown, the VAN generator 142 generates a virtual number 125 comprising the virtual account number, expiration date, and CVV value.

The virtual number 125 may then be transmitted to the mobile device 110 via the network. Once received, the account application 113 provides one or more elements of the virtual number 125 to the clipboard 114 of the OS 112. For example, the account application 113 may extract the virtual account number from the virtual number 125 and provide the extracted virtual account number to the clipboard 114, thereby copying the virtual account number to the clipboard 114. Doing so allows the user to return to the web browser 115 and paste the virtual account number from the clipboard to the account number field of the form in the web browser 115.

Figure 1C:
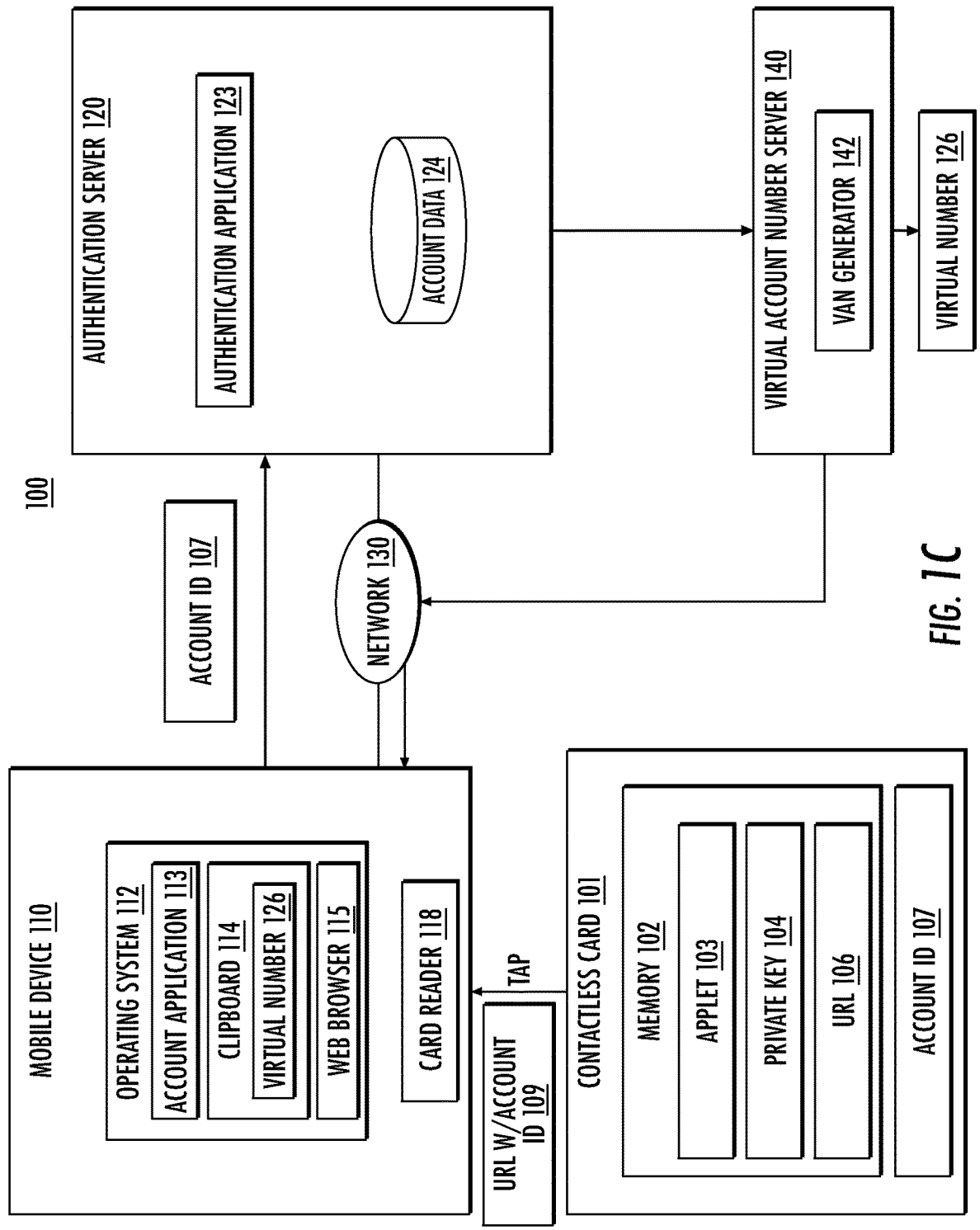

FIG. 1C depicts an embodiment where the applet 103 of the contactless card 101 generates an identifier for verification by the authentication application 123. As stated, when a user may encounter a payment form in the web browser 115. In response, the OS 112 and/or the account application 113 may output a notification instructing the user to tap the contactless card 101 to the mobile device 110. In some embodiments, the user may select a form field associated with payment (e.g., an account number field, expiration date field, and/or CVV field), which brings focus to the form field. In such embodiments, the OS 112 and/or the account application 113 may output the notification to tap the contactless card 101 to the mobile device 110 upon determining the payment field has received focus.

Responsive to the tap, the applet 103 of the contactless card determines an identifier to include as a parameter of the URL 106. In one embodiment, the applet 103 selects a predefined number of characters of the account identifier 107 associated with the contactless card 101. For example, the applet 103 may select the last 4 digits of the account ID 107, and append the selected digits to the URL 106, thereby generating the URL with account ID 109. As stated, the URL 106 may be a universal link that opens one or more predefined pages of the account application 113.

The contactless card 101 may then transmit the URL with account ID 109 to the mobile device 110. The account application 113 may then be opened to the corresponding page, where the account application 113 extracts the digits of the account ID 107 from the URL with account ID 109. In some embodiments, if the user is not logged in to the account application 113, the account application 113 opens a login page where the user provides credentials to log in to an account in prior to extracting the encrypted data 105. The account application 113 may then transmit the digits of the account ID 107 to the authentication server 120 via the network 130. The authentication application 123 may then validate the account ID 107. For example, the authentication application 123 may determine whether the digits of the account ID 107 match the corresponding digits of the account identifier for the account associated with the contactless card 101 in the account data 124. In such embodiments, the account application 113 may provide data (e.g., an account token, a username associated with the account currently logged in to the account application 113, etc.) allowing the authentication application 123 to verify that the account ID 107 is associated with an account in the account data 124.

If the authentication application 123 verifies the account ID 107, the authentication application 123 instructs the VAN generator 142 to generate a virtual account number. Otherwise, a virtual account number is not generated responsive to the tap of the contactless card 101. In one embodiment, if the authentication application 123 is able to verify the account, the authentication application 123 may cause the account application 113 to log in to the corresponding account without requiring user input.

As shown, after verification of the account ID 107 by the authentication application 123, the VAN generator 142 generates a virtual number 126 comprising a virtual account number, expiration date, and CVV value. The virtual number 126 may then be transmitted to the mobile device 110 via the network. Once received, the account application 113 provides one or more elements of the virtual number 126 to the clipboard 114 of the OS 112. For example, the account application 113 may extract the virtual account number from the virtual number 126 and provide the extracted virtual account number to the clipboard 114, thereby copying the virtual account number to the clipboard 114. Doing so allows the user to return to the web browser 115 and paste the virtual account number from the clipboard to the account number field of the form in the web browser 115. The expiration date and/or CVV may similarly be extracted by the account application 113 and provided to the clipboard 114. Doing so allows the expiration date and/or CVV may be pasted from the clipboard 114 into the corresponding fields in the form of the web browser 115.

As stated, the VAN generator 142 and/or the authentication server 120 may further provide the account holder name, billing address, and/or shipping address to the mobile device 110. In some embodiments, however, the account holder name, shipping address, and/or billing address are stored locally by the account application 113 and/or the mobile device 110. Therefore, in such embodiments, the account application 113 may provide the account holder name, billing address, and/or shipping address to the clipboard 114. Doing so allows the user to paste the account holder name, shipping address, and/or billing address from the clipboard to the account number field of the form in the web browser 115.

FIG. 2A is a schematic 200 depicting an example embodiment of tapping the contactless card 101 to generate a virtual account number and copy the virtual account number to the clipboard 114. As shown, the web browser 115 outputs a form including form fields 201-203 (e.g. a payment form), where field 201 corresponds to an account number field, field 202 corresponds to an expiration date field, and field 203 corresponds to a CVV field. As shown, a notification 204 is outputted by the OS 112 and/or the account application 113 when the account number field 201 receives focus (e.g., is selected by the user). The notification 204 instructs the user to tap the contactless card 101 to the mobile device 110. In one embodiment, the user selects the notification 204 prior to tapping the contactless card 101 to the mobile device 110.

As stated, once the contactless card 101 is tapped to the mobile device 110, the account application 113 transmits, via the card reader 118 (e.g., via NFC, Bluetooth, RFID, and/or the EMV protocol etc.), an indication to the contactless card 101. The indication may specify to generate a URL with encrypted data. As stated, the applet 103 may generate the URL with encrypted data using the private key 104 of the contactless card. The applet 103 may then generate the URL with encrypted data as a parameter of the URL and transmit the URL with encrypted data to the mobile device 110. Once received, the URL with encrypted data may cause a page of the account application 113 to be opened.

FIG. 2B is a schematic 210 depicting an embodiment where the account application 113 has been opened responsive to receiving the URL with encrypted data from the contactless card 101. As shown, the account application 113 requires a user to provide a fingerprint to log in to their account. In other embodiments, the user may log into the account using FaceID, other biometric identifiers, a username/password, or any other type of credential. In some embodiments, user login is not required. Once the user logs in to the account, the account application 113 transmits the encrypted data to the authentication application 123. Once verified (e.g., decrypted), the authentication application 123 causes the VAN generator 142 to generate a virtual account number, expiration date, and CVV associated with the contactless card 101. The VAN generator 142 may then transmit the virtual account number, expiration date, and CVV to the mobile device 110. As shown, once received, the account application 113 copies the virtual account number to the clipboard 114 of the OS. In one embodiment, the account application 113 copies the virtual account number to the clipboard 114 based on a determination that the account number field has focus. The account application 113 may then generate and output a link 205 (or other graphical object) that allows the user to return to the previous application (e.g., the web browser 115).

Figure 2C:
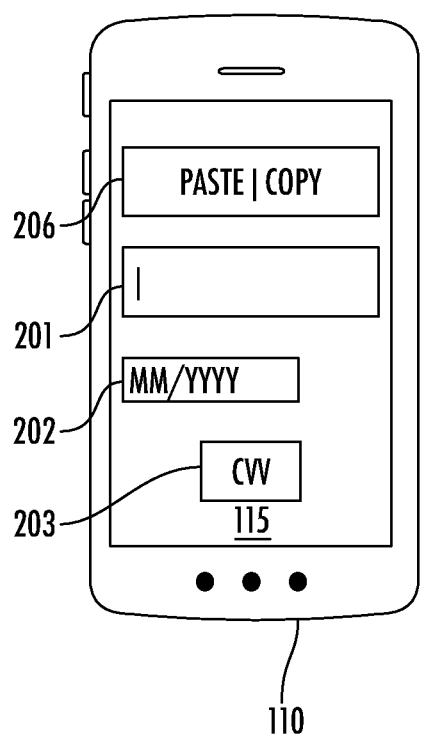
Figure 2D:
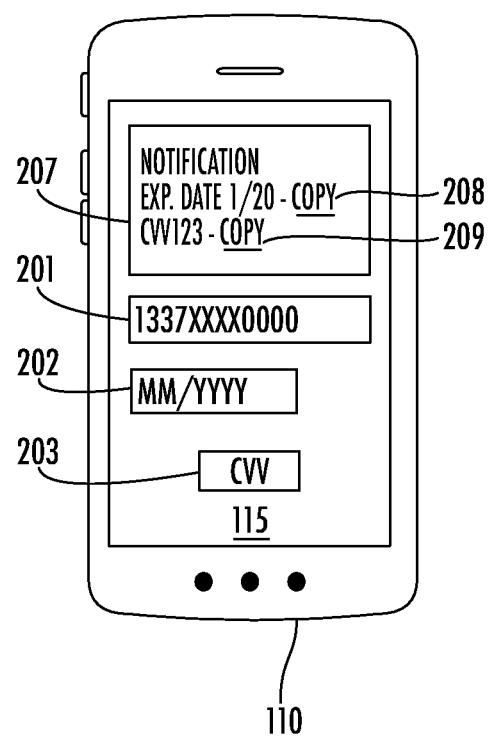

FIG. 2C is a schematic 220 depicting an embodiment where the user has selected the link 205 to return to the web browser 115. As shown, a notification 206 may allow the user to paste the virtual account number to the form field 201 (e.g., after the user long presses on the form field 201). Once selected, the OS 112 may cause the virtual card number to be pasted from the clipboard 114 to the form field 201. FIG. 2D is a schematic 230 depicting an embodiment where the virtual account number has been pasted to the form field 201. As shown, the OS 112 and/or the account application 113 may output a notification 207. The notification 207 includes the expiration date and CVV associated with the virtual account number that was received from the VAN generator 142. As shown, the notification 207 includes a link 208 which, when selected, copies the expiration date to the clipboard 114. Similarly, the notification 207 includes a link 209 which, when selected, copies the CVV to the clipboard 114. Other graphical objects may be used instead of links. In some embodiments, the outputting of the notification 207 is timed to facilitate easy copy/pasting of the expiration date and CVV. For example, the account application 113 may start a timer responsive to receiving the virtual account number, expiration date, and CVV from the VAN generator 142. As another example, the account application 113 may start the timer when the user selects the link 205 to return to the web browser 115. Once the timer exceeds a predefined time threshold (e.g., 5 seconds, 10 seconds, etc.), the notification 207 is generated and outputted. Doing so gives the user time to paste the account number to the form field 201 without being distracted by the notification 207, while providing the notification 207 in a timely manner to facilitate copying and/or pasting of the expiration date and/or CVV.

FIG. 3A is a schematic 300 depicting an example embodiment of tapping the contactless card 101 to generate a virtual account number and copy the virtual account number to the clipboard 114. As shown, the web browser 115 has loaded a website from a URL 305. The website includes a form having form fields 301-303 (e.g. a payment form) and may be in a first tab of the web browser 115. The field 301 corresponds to an account number field, field 302 corresponds to an expiration date field, and field 303 corresponds to a CVV field. As shown, a notification 304 is outputted by the OS 112 and/or the account application 113 when the account number field 301 receives focus (e.g., is selected by the user). The notification 304 instructs the user to tap the contactless card 101 to the mobile device 110. In one embodiment, the user selects the notification 304 prior to tapping the contactless card 101 to the mobile device 110.

To determine that a field has received focus, the account application 113 and/or the OS 112 may analyze a hypertext markup language (HTML) attribute of the account number field 301 to determine that the account number field 301 has received focus. Furthermore, the account application 113 and/or the OS 112 may analyze the metadata of the account number field 301 to determine that the field 301 is associated with the account number. For example, the account application 113 and/or the OS 112 may determine, based on the metadata, that the account number field 301 is configured to receive 16 characters as input. As another example, the metadata may specify a name for the form field 301 that is similar to names associated with account number fields (e.g., "accountnumber", "account_number", etc.).

As stated, once the contactless card 101 is tapped to the mobile device 110, the account application 113 transmits, via the card reader 118 (e.g., via NFC, Bluetooth, RFID, and/or the EMV protocol etc.), an indication to the contactless card 101. The indication may specify to generate a URL with encrypted data. However, in some embodiments, the contactless card 101 causes the applet 103 to generate the URL with encrypted data without requiring instructions received from the mobile device 110. As stated, the applet 103 may generate the URL with encrypted data using the private key 104 of the contactless card 101. In the example depicted in FIG. 3A, the applet 103 may generate the example encrypted string of "ABCD123XYZ" using the private key 104. The applet 103 may then generate a URL to the authentication application 123, where the URL includes the encrypted data as a parameter of the URL. In the example depicted in FIG. 3A, the URL with encrypted data may be "https:///www.example.com/auth.html?ABCD123XYZ". The applet 103 may then transmit the URL with encrypted data to the mobile device 110.

FIG. 3B is a schematic 310 illustrating an embodiment where a new tab of the web browser 115 is opened responsive to receiving the URL with encrypted data from the contactless card 101. As shown, the URL 306 of the web browser is directed to the URL with encrypted data generated by the applet 103, namely "https:///www.example.com/auth.html?ABCD123XYZ". The authentication application 123 may decrypt the encrypted data using the private key 104 to verify the encrypted data. The authentication application 123 may then instruct the VAN generator 142 to generate a virtual account number, expiration date, and CVV. In some embodiments, however, the VAN generator 142 generates the virtual account number and selects an existing expiration date and/or CVV (e.g., from the account data 124). In some such examples, the existing expiration date and/or CVV may be the expiration date and/or CVV of the contactless card 101, or another card associated with the account in the account data 124.

As shown in FIG. 3B, the tab of the web browser 115 includes the virtual account number, expiration date, and CVV. In one embodiment, the VAN generator 142 provides the generated data to the authentication application 123. Doing so allows the authentication application 123 to output the data in the web browser 115. Other techniques may be used to redirect the web browser 115 to the VAN generator 142, which may output the virtual account number, expiration date, and CVV in the web browser 115. As shown, the web browser 115 includes a notification to the user to close the tab of the web browser 115 once the user copies/pastes the virtual account number, expiration date, and CVV.

Figure 3C:
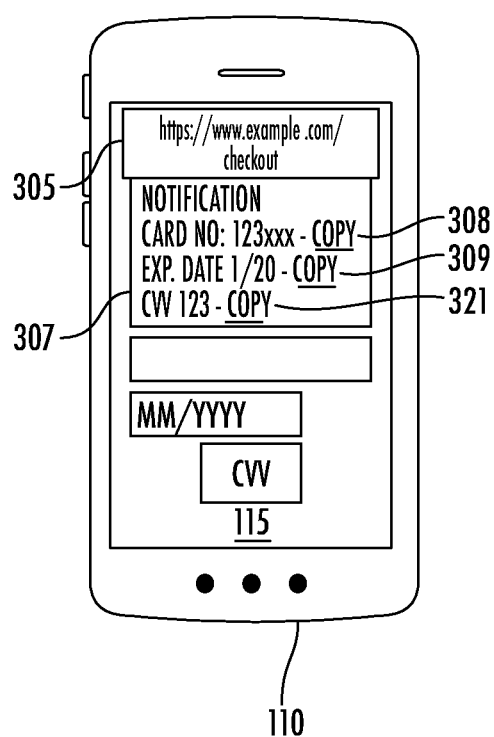

FIG. 3C is a schematic 320 depicting an embodiment where the VAN generator 142 and/or the authentication application 123 transmits a push notification 307 to the mobile device including the virtual account number, expiration date, and CVV generated by the VAN generator 142. The virtual account number, expiration date, and CVV may be generated based on any technique described herein. In one embodiment, the notification 307 is generated instead of (or in addition to) outputting the virtual account number, expiration date, and CVV in the web browser 115 in FIG. 3B. As shown, the notification 307 includes the virtual account number, expiration date, and CVV. As shown, the notification 307 includes a link 308 which, when selected, copies the virtual account number to the clipboard 114. Similarly, the notification 307 includes a link 309 which, when selected, copies the expiration date to the clipboard 114. Similarly, the notification 307 includes a link 321 which, when selected, copies the CVV to the clipboard 114. Other graphical objects may be used instead of links. In some embodiments, the outputting of the notification 307 is timed to facilitate easy copy/pasting of the expiration date and CVV, e.g., upon expiration of a timer as described above.

Figure 3D:
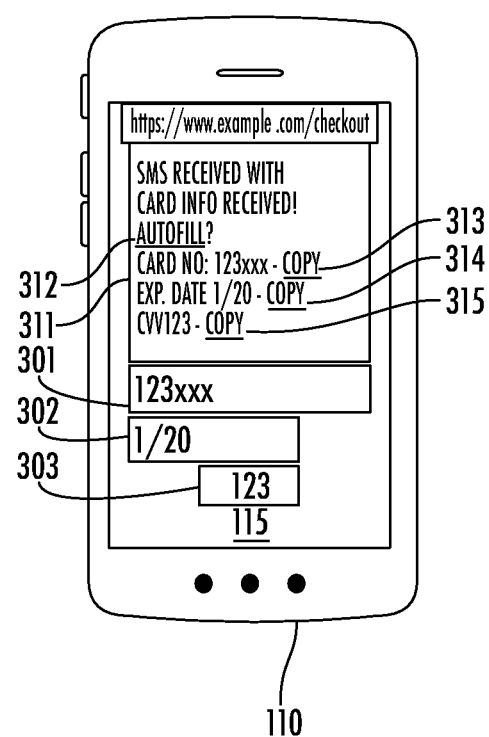

FIG. 3D is a schematic 330 depicting an embodiment where the VAN generator 142 and/or the authentication application 123 transmits a text message notification 311 to the mobile device including the virtual account number, expiration date, and CVV generated by the VAN generator 142. The virtual account number, expiration date, and CVV may be generated based on any technique described herein. In one embodiment, the text message notification 311 is generated instead of (or in addition to) outputting the virtual account number, expiration date, and CVV in the web browser 115 in FIG. 3B. As shown, the text message notification 311 includes the virtual account number, expiration date, and CVV. As shown, the text message notification 311 includes a link 313 which, when selected, copies the virtual account number to the clipboard 114. Similarly, the text message notification 311 includes a link 314 which, when selected, copies the expiration date to the clipboard 114. Similarly, the text message notification 311 includes a link 315 which, when selected, copies the CVV to the clipboard 114. Other graphical objects may be used instead of links. Furthermore, as shown, the text message 311 includes an autofill link 312, which when selected, autofills the virtual account number, expiration date, and CVV into the form fields 301-303, respectively. In at least one embodiment, an autofill service (not pictured) of the OS autofills the account number, expiration date, and CVV into the form fields 301-303. In some embodiments, the autofill service detects a form field (e.g., the form fields 301-303), detects content in a notification (e.g., the notification 311) that has a type which matches the type of the detected form field, and offers the content parsed from the notification into an autofill suggestion in the keyboard. Doing so allows the autofill service to automatically fill the data from the notification to the corresponding form fields.

Although not depicted in FIGS. 2A-2D and 3A-3D, the account holder name, billing address, and/or shipping address may be copied to the clipboard 114 and pasted to corresponding form fields in the web browser. As stated, the name, billing address, and/or shipping address may be stored locally on the mobile device 110 and/or received from the VAN generator 142 and/or the authentication server 120.

Figure 4:
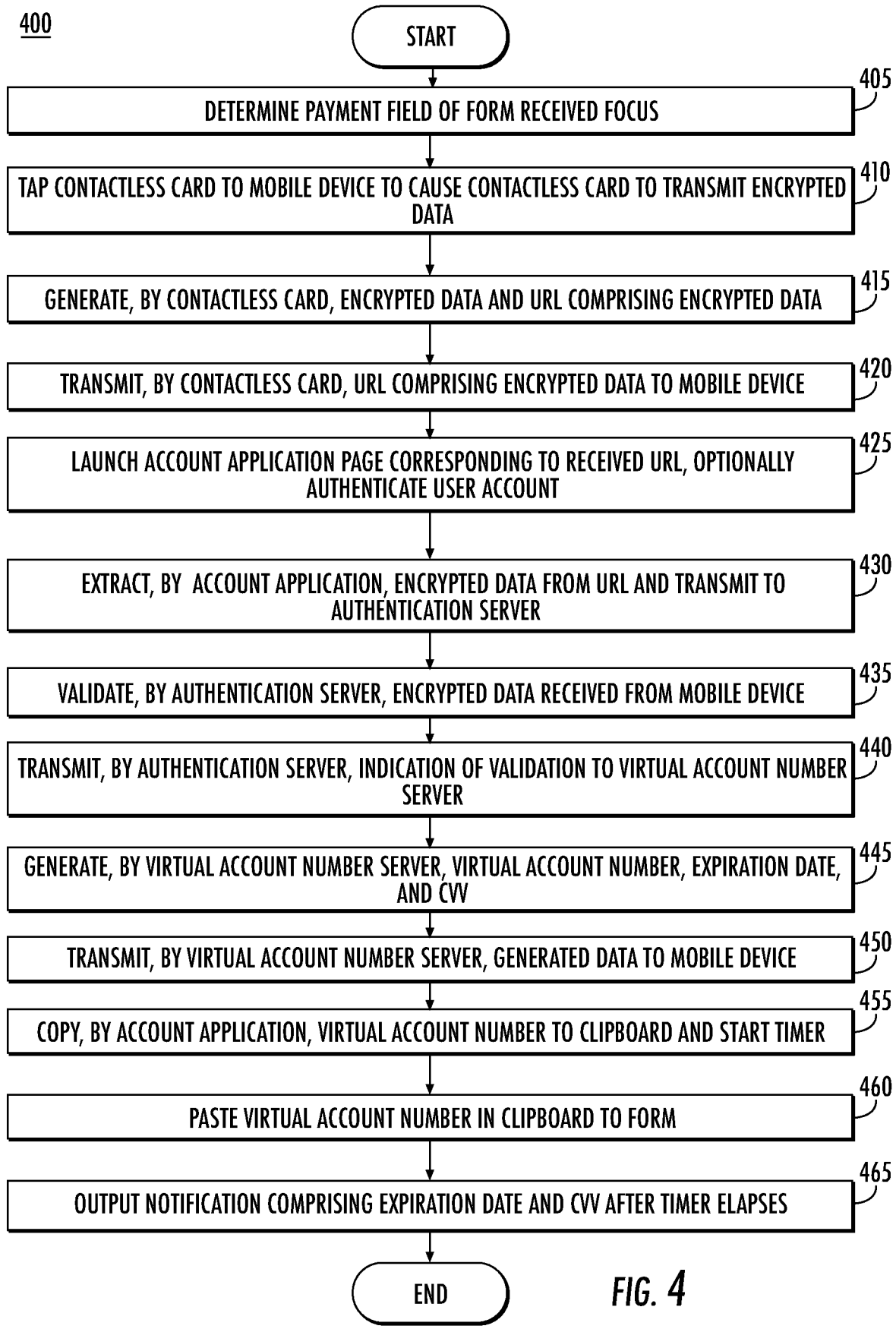
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to use a contactless card to generate a virtual account number and copy the virtual account number to the clipboard 114. Embodiments are not limited in this context.

As shown, the logic flow 400 begins at block 405, where the account application 113 and/or the OS 112 determines that a payment field of a form has received focus. The form may be in the web browser 115, the account application 113, and/or a different application. For example, a user may tap the payment field of the form to give the payment field focus. As another example, the user may select the payment field of the form using a mouse and/or keyboard. More generally, any technique may be used to give the payment field focus, including programmatically generated focus. For example, the payment field may receive focus based on the HTML "focus( )" method. As another example, the payment field may automatically receive focus when the form is loaded, e.g., based on the "autofocus" HTML attribute being applied to the payment field in source code. The payment field may include one or more of a name field, an account number field, expiration date field, a shipping address field, a billing address field, and/or a CVV field. Once the payment field receives focus, the account application 113 and/or the OS 112 may output a notification specifying to the user to tap the contactless card 101 to the mobile device 110. In some embodiments, the notification may be generated based on a determination that the form includes one or more payment fields and without requiring a determination that the form field has received focus. The notification may include a GUI which provides an example of how to tap the contactless card 101 to the mobile device 110. At block 410, a user taps the contactless card 101 to the mobile device to cause the contactless card 101 to generate and transmit encrypted data as part of a URL. The account application 113 may transmit an indication to the contactless card 101 via the NFC card reader 118 specifying to generate and transmit encrypted data as part of the URL.

At block 415, the applet 103 of the contactless card generates the encrypted data using the private key 104 and a cryptographic algorithm. The applet 103 may then include the encrypted data as a parameter of a URL. The URL may be a universal link URL which at least in part causes a predefined page of the account application 113 to be opened when followed. At block 420, the applet 103 may transmit the URL including the encrypted data to the mobile device 110. At block 425, the account application 113 is opened to the page corresponding to the universal link URL received from the contactless card 101. In some embodiments, the account application 113 may require the user to log in to their account (if not already logged in). In some such embodiments, the URL may be directed to an external authentication website configured to receive credentials required to log the user in to their account. As another example, the URL may be directed to an authentication page of the account application 113 that receives credentials required to log the user in to their account.

At block 430, the account application 113 extracts the encrypted data from the URL and transmits the encrypted data to the authentication application 123 of the authentication server 120 for verification. If the encrypted data is encoded, the account application 113 and/or the authentication application 123 may decode the encrypted data. At block 435, the authentication application 123 decrypts the encrypted data using the private key in the memory of the server 120 to validate the encrypted data. At block 440, the authentication application 123 transmits an indication to the VAN generator 142 specifying to generate a virtual account number, expiration date, and CVV. The authentication application 123 may further specify one or more restrictions on the virtual account number (e.g., must be used within 1 hour, can only be used at a specified merchant's website, etc.). At block 445, the VAN generator 142 generates the virtual account number, expiration date, and CVV. At block 450, the VAN generator 142 transmits the virtual account number, expiration date, and CVV to the mobile device 110. The VAN generator 142 may further transmit the account holder name, billing address, and/or shipping address to the mobile device 110, which may be received by the VAN generator 142 from the authentication server 120. For example, the VAN generator 142 may generate a push notification, a text message, or one or more data packets processed by the account application 113 to receive the virtual account number, expiration date, and CVV.

At block 455, the account application 113 copies the virtual account number to the clipboard 114 of the OS. The account application 113 may further start a timer. At block 460, the user may return to the web browser 115, and paste the virtual account number stored in the clipboard 114 to the payment field of the form. At block 465, the account application 113 outputs a notification specifying the account holder name, billing address, shipping address, expiration date, and/or CVV after the timer set at block 455 elapses (or exceeds a threshold amount of time). Doing so allows the user to copy and paste the account holder name, billing address, shipping address, expiration date, and/or CVV to the corresponding fields of the form.

Figure 5:
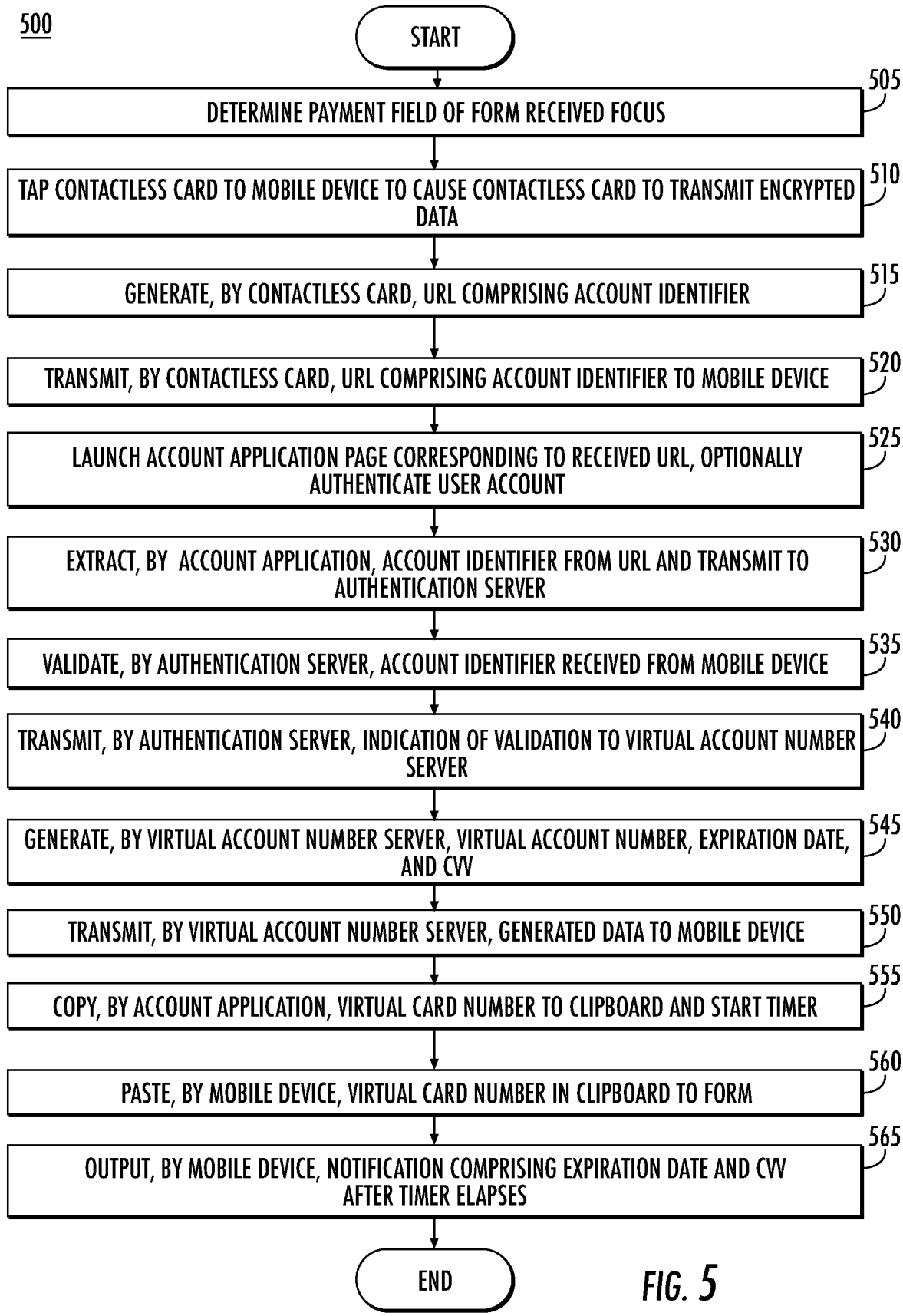
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations to use a contactless card to generate a virtual account number and copy the virtual account number to the clipboard 114. Embodiments are not limited in this context.

As shown, the logic flow 500 begins at block 505, where the account application 113 and/or the OS 112 determines that a payment field of a form has received focus. The form may be in the web browser 115, the account application 113, and/or a different application. For example, a user may tap the payment field of the form to give the payment field focus. As another example, the user may select the payment field of the form using a mouse and/or keyboard. More generally, any technique may be used to give the payment field focus, including programmatically generated focus. For example, the payment field may receive focus based on the HTML "focus( )" method. As another example, the payment field may automatically receive focus when the form is loaded, e.g., based on the "autofocus" HTML attribute being applied to the payment field in source code. The payment field may include one or more of a name field, an account number field, expiration date field, a shipping address field, a billing address field, and/or a CVV field. Once the payment field receives focus, the account application 113 and/or the OS 112 may output a notification specifying to the user to tap the contactless card 101 to the mobile device 110. In some embodiments, the notification may be generated based on a determination that the form includes one or more payment fields. The notification may include a GUI which depicts an example of how to tap the contactless card 101 to the mobile device 110. At block 510, a user taps the contactless card 101 to the mobile device to cause the contactless card 101 to generate and transmit data as part of a URL. The account application 113 may transmit an indication to the contactless card 101 via the NFC card reader 118 specifying to generate and transmit data as part of the URL.

At block 515, the applet 103 of the contactless card generates a URL which include an account identifier (or a portion thereof) as a parameter of the URL. The URL may be a universal link URL which at least in part causes a predefined page of the account application 113 to be opened when followed. At block 520, the applet 103 may transmit the URL including the account identifier to the mobile device 110. At block 525, the account application 113 is opened to the page corresponding to the universal link URL received from the contactless card 101. In some embodiments, the account application 113 may require the user to log in to their account (if not already logged in).

At block 530, the account application 113 extracts the account identifier from the URL and transmits the account identifier to the authentication application 123 of the authentication server 120 for verification. At block 535, the authentication application 123 validates the account identifier (e.g., by determining whether the received account identifier matches an expected and/or known account identifier value). At block 540, the authentication application 123 transmits an indication to the VAN generator 142 specifying to generate a virtual account number, expiration date, and CVV. The authentication application 123 may further specify one or more restrictions on the virtual account number (e.g., must be used within 1 hour, can only be used at a specified merchant's website, etc.). At block 545, the VAN generator 142 generates the virtual account number, expiration date, and CVV. At block 550, the VAN generator 142 transmits the virtual account number, expiration date, and CVV to the mobile device 110. The VAN generator 142 may further transmit the account holder name, billing address, and/or shipping address to the mobile device 110, which may be received by the VAN generator 142 from the authentication server 120. For example, the VAN generator 142 may generate a push notification, a text message, or one or more data packets processed by the account application 113 to receive the virtual account number, expiration date, and CVV.

At block 555, the account application 113 copies the virtual account number to the clipboard 114 of the OS. The account application 113 may further start a timer. At block 560, the user may return to the web browser 115, and paste the virtual account number stored in the clipboard 114 to the payment field of the form. At block 565, the account application 113 outputs a notification specifying the account holder name, billing address, shipping address, expiration date, and/or CVV after the timer set at block 555 elapses (or exceeds a threshold amount of time). Doing so allows the user to copy and paste the account holder name, billing address, shipping address, expiration date, and/or CVV to the corresponding fields of the form.

Figure 6:
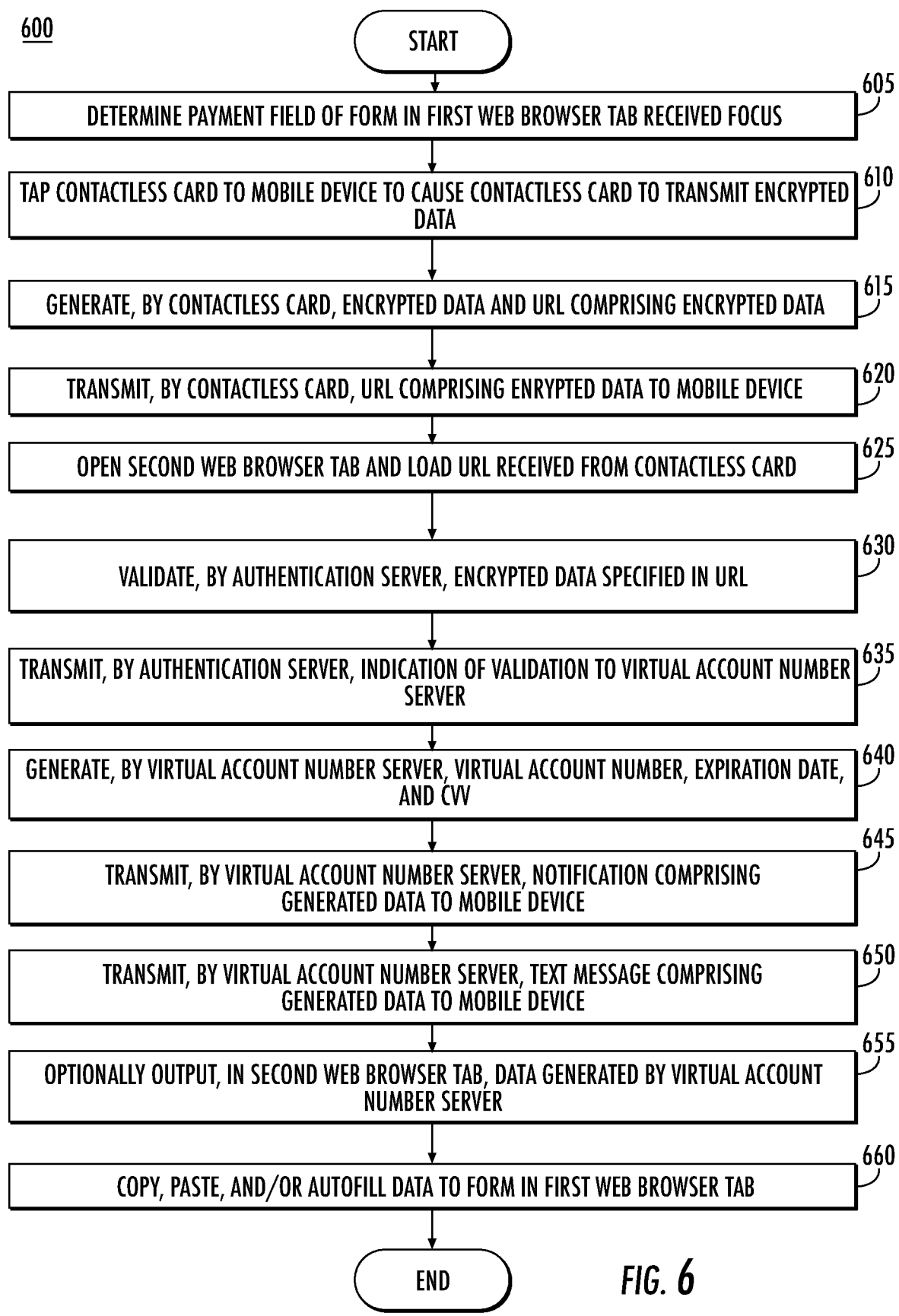
FIG. 6 illustrates an embodiment of a third logic flow.

FIG. 6 illustrates an embodiment of a logic flow 600. The logic flow 600 may be representative of some or all of the operations executed by one or more embodiments described herein. For example, the logic flow 600 may include some or all of the operations to use a contactless card to generate a virtual account number and copy the virtual account number to the clipboard 114. Embodiments are not limited in this context.

As shown, the logic flow 600 begins at block 605, where the account application 113 and/or the OS 112 determines that a payment field of a form has received focus. The form may be in a first tab of the web browser 115. For example, a user may tap the payment field of the form to give the payment field focus. As another example, the user may select the payment field of the form using a mouse and/or keyboard. More generally, any technique may be used to give the payment field focus, including programmatically generated focus. For example, the payment field may receive focus based on the HTML "focus ( )" method. As another example, the payment field may automatically receive focus when the form is loaded, e.g., based on the "autofocus" HTML attribute being applied to the payment field in source code. The payment field may include one or more of a name field, an account number field, expiration date field, a shipping address field, a billing address field, and/or a CVV field. Once the payment field receives focus, the account application 113 and/or the OS 112 may output a notification specifying to the user to tap the contactless card 101 to the mobile device 110. In some embodiments, the notification may be generated based on a determination that the form includes one or more payment fields. The notification may include a GUI which depicts an example of how to tap the contactless card 101 to the mobile device 110. At block 610, a user taps the contactless card 101 to the mobile device to cause the contactless card 101 to generate and transmit encrypted data as part of a URL. The account application 113 may transmit an indication to the contactless card 101 via the NFC card reader 118 specifying to generate and transmit encrypted data as part of the URL.

At block 615, the applet 103 of the contactless card generates the encrypted data using the private key 104 and a cryptographic algorithm. The applet 103 may then include the encrypted data as a parameter of a URL. The URL may be a URL to the authentication application 123 and/or the authentication server 120 which causes a second tab of the web browser 115 to be opened. At block 620, the applet 103 may transmit the URL including the encrypted data to the mobile device 110. At block 625, the web browser 115 opens a second tab and loads the URL including the encrypted data.

At block 630, the authentication application 123 extracts the encrypted data from the URL and decrypts the encrypted data using the private key in the memory of the server 120 to validate the encrypted data. At block 635, the authentication application 123 transmits an indication to the VAN generator 142 specifying to generate a virtual account number, expiration date, and CVV. The authentication application 123 may further specify one or more restrictions on the virtual account number (e.g., must be used within 1 hour, can only be used at a specified merchant's website, etc.). At block 640, the VAN generator 142 generates the virtual account number, expiration date, and CVV.

At block 645, the VAN generator 142 transmits a push notification comprising the virtual account number, expiration date, and CVV to the mobile device 110. The VAN generator 142 may further transmit the account holder name, billing address, and/or shipping address as part of the push notification. The mobile device 110 may then output the received push notification. In addition and/or alternatively, at block 650, the VAN generator 142 transmits a text message comprising the virtual account number, expiration date, and CVV to the mobile device 110. The mobile device 110 may then output a notification corresponding to the text message, where the notification displays the virtual account number, expiration date, and CVV. In addition and/or alternatively, at block 655, the virtual account number, expiration date, CVV, account holder name, billing address, and/or shipping address are optionally outputted for display in the second tab of the web browser 115. At block 660, one or more of the virtual account number, expiration date, CVV, account holder name, billing address, and/or shipping address may be copied from one or more of the push notification, the text message notification, and the second browser tab, and pasted into the form in the first browser tab. In addition and/or alternatively, the virtual account number, expiration date, CVV, account holder name, billing address, and/or shipping address may be autofilled into the form.

Figure 7:
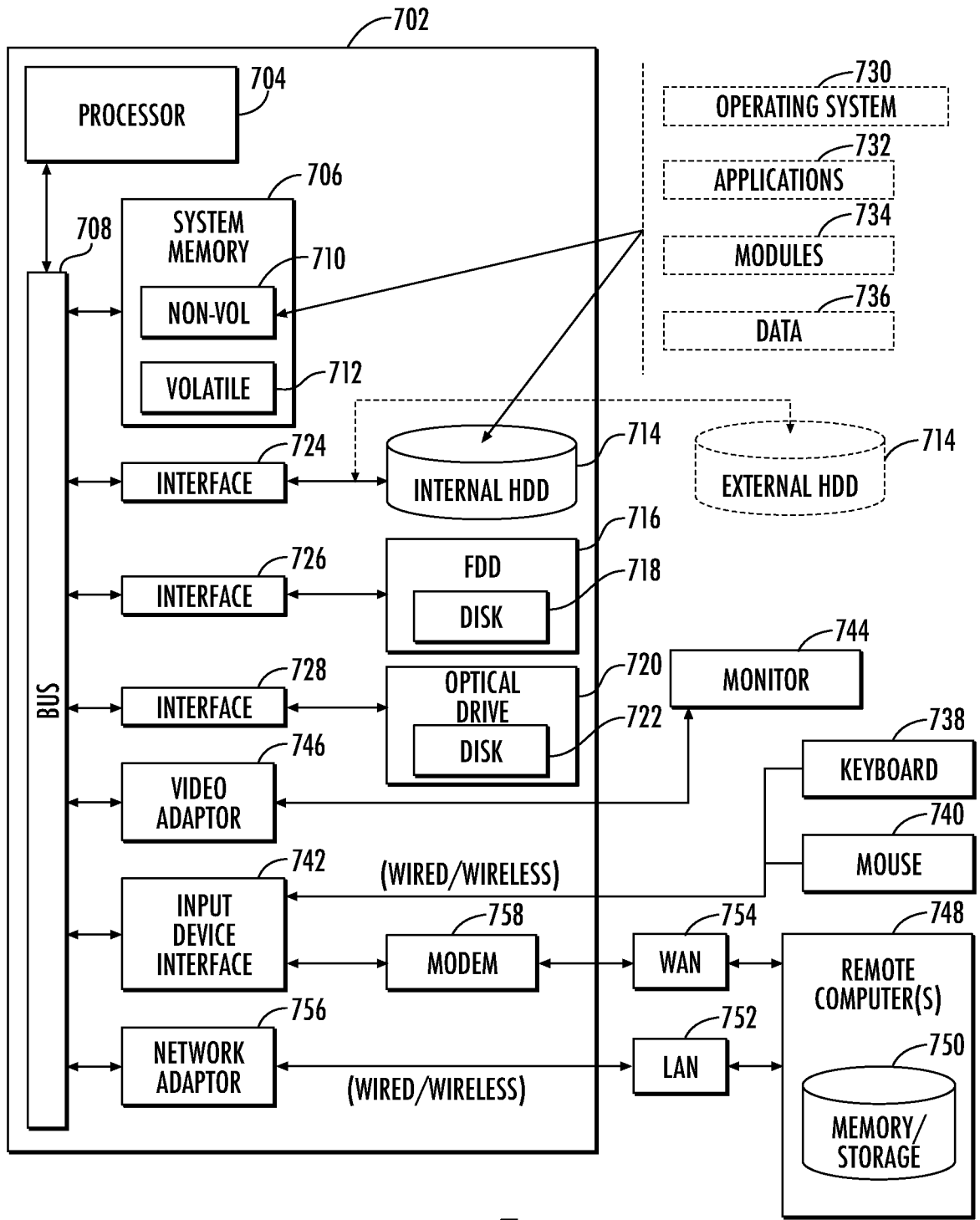
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the mobile devices 110, authentication server 120, and/or the virtual account number server 140 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., the operating system 112, account application 113, clipboard 114, web browser 115, the authentication application 123, and the VAN generator 142.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
    receiving, by a processor of a computing device from a contactless card, a uniform resource locator (URL), the URL comprising a cryptogram;
    opening, by an operating system (OS) executing on the processor, an application based on the URL;
    transmitting, by the application, the cryptogram to an authentication server;
    receiving, by the application, a virtual account number from a virtual account number server;
    copying, by the application, the virtual account number to a clipboard of the OS; and
    pasting, by the OS, the virtual account number from the clipboard to a payment field of a form.

2. The method of claim 1, further comprising, prior to receiving the URL:
    determining, by the application, that the payment field of the form has received focus.

3. The method of claim 1, wherein the URL comprises a universal link URL directed to a page of the application.

4. The method of claim 1, further comprising:
    receiving an expiration date of the virtual account number, a card verification value (CVV) of the virtual account number, and a billing address from the virtual account number server; and
    copying, by the application, one of the expiration date, the CVV, and the billing address to the clipboard; and
    pasting, by the OS, the one of the expiration date, the CVV, and the billing address from the clipboard to another field of the form.

5. The method of claim 1, wherein the virtual account number is associated with a restriction, the restriction comprising one or more of a merchant restriction, a time restriction, a location restriction, or an amount restriction.

6. The method of claim 1, further comprising:
    authenticating, by the application, an account associated with the contactless card.

7. The method of claim 1, further comprising:
    receiving, via one of a push notification or the application, input specifying to copy the virtual account number to the clipboard.

8. A non-transitory computer-readable storage medium, the computer-readable storage medium including instructions that when executed by a processor, cause the processor to:
    receive, from a contactless card, a uniform resource locator (URL) comprising a cryptogram;
    open, by an operating system (OS) executing on the processor, an application based on the URL;
    transmit, by the application, the cryptogram to an authentication server;
    receive, by the application, a virtual account number from a virtual account number server;
    copy, by the application, the virtual account number to a clipboard of the OS; and
    paste, by the OS, the virtual account number from the clipboard to a payment field of a form.

9. The computer-readable storage medium of claim 8, wherein the instructions further cause the processor to, prior to receiving the URL:
    determine, by the application, that the payment field of the form has received focus.

10. The computer-readable storage medium of claim 8, wherein the URL comprises a universal link URL directed to a page of the application.

11. The computer-readable storage medium of claim 8, wherein the instructions further cause the processor to:
    receive an expiration date of the virtual account number, a card verification value (CVV) of the virtual account number, and a billing address from the virtual account number server; and copy, by the application, one of the expiration date, the CVV, and the billing address to the clipboard; and paste, by the OS, the one of the expiration date, the CVV, and the billing address from the clipboard to another field of the form.

12. The computer-readable storage medium of claim 8, wherein the virtual account number is associated with a restriction, the restriction comprising one or more of a merchant restriction, a time restriction, a location restriction, or an amount restriction.

13. The computer-readable storage medium of claim 8, wherein the instructions further cause the processor to:

authenticate, by the application, an account associated with the contactless card.

14. The computer-readable storage medium of claim 8, wherein the instructions further cause the processor to:

receive, via one of a push notification or the application, input specifying to copy the virtual account number to the clipboard.

15. A computing apparatus comprising:

a processor; and a memory storing instructions that, when executed by the processor, cause the processor to:

receive, from a contactless card, a uniform resource locator (URL) comprising a cryptogram;

open, by an operating system (OS) executing on the processor, an application based on the URL;

transmit, by the application, the cryptogram to an authentication server;

receive, by the application, a virtual account number from a virtual account number server;

copy, by the application, the virtual account number to a clipboard of the OS; and paste, by the OS, the virtual account number from the clipboard to a payment field of a form.

16. The computing apparatus of claim 15, wherein the instructions further cause the processor to, prior to receiving the URL:

determine, by the application, that the payment field of the form has received focus.

17. The computing apparatus of claim 15, wherein the URL comprises a universal link URL directed to a page of the application.

18. The computing apparatus of claim 15, wherein the instructions further cause the processor to:

receive an expiration date of the virtual account number, a card verification value (CVV) of the virtual account number, and a billing address from the virtual account number server; and copy, by the application, one of the expiration date, the CVV, and the billing address to the clipboard; and paste, by the OS, the one of the expiration date, the CVV, and the billing address from the clipboard to another field of the form.

19. The computing apparatus of claim 15, wherein the virtual account number is associated with a restriction, the restriction comprising one or more of a merchant restriction, a time restriction, a location restriction, or an amount restriction.

20. The computing apparatus of claim 15, wherein the instructions further cause the processor to:

authenticate, by the application, an account associated with the contactless card.

\* \* \* \* \*